United States Patent
Klatt et al.

(10) Patent No.: US 11,706,703 B2
(45) Date of Patent: Jul. 18, 2023

(54) CONFIGURING AN SDR CAPABLE USER EQUIPMENT

(71) Applicant: Deutsche Telekom AG, Bonn (DE)

(72) Inventors: Axel Klatt, Cologne (DE); Raimund Walsdorf, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/771,832

(22) PCT Filed: Oct. 28, 2020

(86) PCT No.: PCT/EP2020/080327
§ 371 (c)(1),
(2) Date: Apr. 26, 2022

(87) PCT Pub. No.: WO2021/083980
PCT Pub. Date: May 6, 2021

(65) Prior Publication Data
US 2022/0353796 A1    Nov. 3, 2022

(30) Foreign Application Priority Data
Oct. 31, 2019  (EP) .................................... 19206516

(51) Int. Cl.
*H04W 48/16*  (2009.01)
*H04B 1/00*  (2006.01)

(52) U.S. Cl.
CPC .......... *H04W 48/16* (2013.01); *H04B 1/0003* (2013.01)

(58) Field of Classification Search
CPC ............................. H04W 48/16; H04B 1/0003
(Continued)

(56) References Cited

U.S. PATENT DOCUMENTS

| 2005/0066156 A1* | 3/2005 | Moy | H04B 1/0003 |
| | | | 713/1 |
| 2009/0067367 A1 | 3/2009 | Buracchini et al. | |
| 2010/0234063 A1* | 9/2010 | Mueck | H04W 48/12 |
| | | | 455/552.1 |

FOREIGN PATENT DOCUMENTS

| EP | 1545144 A1 | 6/2005 |
| WO | WO 2010026292 A1 | 3/2010 |

OTHER PUBLICATIONS

Moessner K et al.: "Software Download Enabling Terminal Reconfigurability//Telechargement De Logiciel Pour La Reconfiguration De Terminal", Annales Des Telecommunications—Annals of Telecommunications, Get Lavoisier, Paris, FR, vol. 57, No. 5/06, May 1, 2002 (May 1, 2002), pp. 457-479, XP001122781, ISSN: 0003-4347 *Chapter OTA Software Download* figure 2.

* cited by examiner

*Primary Examiner* — Chuck Huynh
(74) *Attorney, Agent, or Firm* — Leydig, Voit & Mayer, Ltd.

(57) ABSTRACT

In a method for configuring a Software Defined Radio (SDR) capable user equipment, the SDR capable user equipment wirelessly loads an SDR program from a radio access network. The SDR capable user equipment executes the loaded SDR program, the SDR program on execution configuring the SDR capable user equipment to support a desired wireless communication technology. The SDR capable user equipment loads the SDR program using a dedicated SDR configuration channel, the dedicated SDR configuration channel being disjoint with any communication channel defined by the desired wireless communication technology. The SDR capable user equipment scans a predetermined frequency spectrum searching a broadcasted beacon. The SDR capable user equipment receives the
(Continued)

broadcasted beacon and tunes to the dedicated SDR configuration channel or a subchannel thereof pointed to by a pointer for loading the SDR program.

9 Claims, 4 Drawing Sheets

(58) Field of Classification Search
USPC .......................................................... 455/434
See application file for complete search history.

CONFIGURING AN SDR CAPABLE USER EQUIPMENT

CROSS-REFERENCE TO PRIOR APPLICATIONS

This application is a U.S. National Phase application under 35 U.S.C. § 371 of International Application No. PCT/EP2020/080327, filed on Oct. 28, 2020, and claims benefit to European Patent Application No. EP 19206516.7, filed on Oct. 31, 2019. The International Application was published in English on May 6, 2021 as WO 2021/083980 A1 under PCT Article 21(2).

FIELD

The invention relates to a method for configuring an SDR (Software Defined Radio) capable user equipment (UE) for supporting a desired wireless communication technology. The invention further relates to an SDR capable user equipment, a radio access network (RAN) and a computer readable storage medium.

BACKGROUND

A radio access network (RAN) may be connected to a user equipment (UE), i.e. a smartphone, a tablet, a notebook and the like, which may also be called a wireless device or a mobile device, for establishing a wireless communication between the RAN and the UE. An actual RAN supports a plurality of different wireless communication technologies, like the standardized global system for communications (GSM), universal mobile telecommunications system (UMTS), long term evolution (LTE), narrow band internet of things (NB-IoT) and fifth generation new radio (NR 5G). The UE has to support at least one of the communication technologies supported by the RAN in order to connect to the RAN and establish the wireless communication. Of course, the RAN is not restricted to support the listed wireless communication technologies and may support others.

Usually a wireless communication technology uses a predetermined frequency band and defines one or more channels within the predetermined frequency band. The wireless communication technology may also require a radio interface of a UE to support one or more functional characteristics as multiple access schemes (FDMA, TDMA, CDMA, OFDMA), coding, modulation and the like. Furthermore, the wireless communication technology comprises a plurality of specified wireless communication protocols supporting different types of the wireless communication.

For establishing the wireless communication, the UE may select a wireless communication technology or a wireless communication protocol of the wireless communication technology depending on a local availability of the RAN and/or depending on a requirement of a service to be used. For instance, low data rates are sufficient for using a voice over LTE (VoLTE) service while high data rates are required for using a multimedia streaming service. Virtual reality (VR) or augmented reality (AR) multimedia services additionally require a very low latency of the communication.

Most embodiments of UEs comprise a specialized wireless communication hardware (HW) supporting at least one predetermined wireless communication technology and, thus, are excluded from using a communication technology being disjoint with any predetermined wireless communication technology supported by the comprised wireless communication HW. For instance, they will generally not support a future wireless communication technology. Accordingly, embodiments of UE comprising a specialized wireless communication HW are rather inflexible.

Alternatively, a UE may comprise a generic wireless communication HW to be enabled for any wireless communication technology. The generic wireless communication HW is enabled for supporting any wireless communication technology by installing a program code, i.e. an executable software (SW) module, to be executed by a processor of the UE. Executing the program enables the UE for supporting the wireless communication technology. Embodiments of UE comprising a generic wireless communication HW are obviously much more flexible than embodiments of UE comprising a specialized wireless communication HW.

The concept of enabling a UE to support a wireless communication technology by installing and executing a program code is known as software defined radio (SDR). Hereinafter, a UE comprising a generic wireless communication HW is called an SDR capable UE and the enabling program code is called an SDR program. Of course, the SDR program may include one or more configuration parameters required by the wireless communication technology or a wireless communication protocol defined by the wireless communication technology.

An SDR program supporting a wireless communication technology may be installed on an SDR capable UE during manufacture or maintenance thereof. WO 2010/026292 A1 describes a method for configuring an SDR capable UE having an installed SDR program. During usage of the UE, the UE may wirelessly receive configuration parameters from a RAN in order to parameterize the installed SDR program for supporting a particular wireless communication protocol of the wireless communication technology.

SUMMARY

In an exemplary embodiment, the present invention provides a method for configuring a Software Defined Radio (SDR) capable user equipment. The method includes: an SDR capable user equipment wirelessly loads an SDR program from a radio access network; the SDR capable user equipment executes the loaded SDR program, the SDR program on execution configuring the SDR capable user equipment to support a desired wireless communication technology; the SDR capable user equipment loads the SDR program using a dedicated SDR configuration channel, the dedicated SDR configuration channel being disjoint with any communication channel defined by the desired wireless communication technology, wherein the radio access network broadcasts a beacon comprising a pointer pointing to a location of the SDR program, the location comprising the dedicated SDR configuration channel or a subchannel of the dedicated SDR configuration channel; the SDR capable user equipment scans a predetermined frequency spectrum searching the broadcasted beacon; and the SDR capable user equipment receives the broadcasted beacon and tunes to the dedicated SDR configuration channel or subchannel thereof pointed to by the pointer for loading the SDR program.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide an SDR capable UE with a more general configurability during usage.

Exemplary embodiments of the present invention provide for configuring an SDR capable UE in a very general way. Exemplary embodiments of the invention provide a RAN, an SDR capable UE and a computer program product.

A first aspect of the invention is a method for configuring an SDR capable user equipment comprising the steps: An SDR capable user equipment wirelessly loads an SDR program from a radio access network and the SDR capable user equipment executes the loaded SDR program. The SDR program, on execution, configures the SDR capable user equipment to support a desired wireless communication technology.

Loading, installing and executing the SDR program enables the SDR capable UE for supporting the wireless communication technology. The SDR capable UE may use the wireless communication protocol for connecting to and communicating with the RAN. Of course, the SDR program may enable the SDR capable UE for supporting more than one wireless communication protocol or a plurality of wireless communication protocols or wireless communication technologies.

In a preferred embodiment, the SDR capable user equipment loads the SDR program using a dedicated SDR configuration channel, the dedicated SDR configuration channel being disjoint with any communication channel defined by the desired wireless communication technology. The dedicated SDR configuration channel may also be disjoint with any communication channel defined by any wireless communication technology. In other words, a frequency of the dedicated SDR configuration channel is preferably different from any frequency of any communication channel of the desired or any wireless communication technology supported by the RAN. Consequently, the dedicated SDR configuration channel and the communication channel are prevented from interfering. Accordingly, a communication using the communication channel is not affected by a use of the dedicated SDR configuration channel.

The dedicated SDR configuration channel preferably is at a different frequency than any communication channel used by the desired wireless communication technology. The dedicated SDR configuration channel may also be at a different frequency than any communication channel defined by any wireless communication technology. The different frequency particularly is either lower or higher than any communication channel used by the desired wireless communication technology or than any communication channel defined by any wireless communication technology.

In a preferred embodiment, the dedicated SDR configuration channel is at a lower frequency. A radio signal being transmitted at a lower frequency typically has a larger range than a radio signal being transmitted at a higher frequency. Providing the dedicated SDR configuration channel at a lower frequency allows for a large area a UE may load the SDR program within.

In an alternative embodiment, the dedicated SDR configuration channel is at a higher frequency. A radio signal being transmitted at a higher frequency has typically a shorter range than a radio signal being transmitted at a lower frequency. Providing the dedicated SDR configuration channel at a higher frequency allows for a high bandwidth a UE may load the SDR program at and/or a short time a UE may load the SDR program within.

In many embodiments the dedicated SDR configuration channel is provided as a unicast channel, a multicast channel or as a broadcast channel. Both the multicast channel and the broadcast channel allow for a small bandwidth of the dedicated SDR configuration channel. Broadcasting is as usual to be understood as simultaneously transmitting data to every reachable receiver while multicasting is as usual to be understood as simultaneously transmitting data to a predefined subset of reachable receivers. Both alternatives allow a sender for transmitting the data once only, thus, not requiring the sender to transmit the data multiple times, i.e. once per receiver. The unicast channel, on the other hand, allows for delivering an SDR program to an individual UE.

In one embodiment, the SDR capable user equipment tunes to a communication request channel provided by the radio access network. Then the SDR capable user equipment, upon a request, receives an SDR pointer via the communication request channel.

Alternatively, the SDR capable user equipment may receive the SDR pointer via any other channel the SDR capable user equipment is capable of The pointer points to a location of the SDR program. The location comprises the dedicated SDR configuration channel or a subchannel of the dedicated SDR configuration channel. After that, the SDR capable user equipment tunes to the dedicated SDR configuration channel or to the subchannel thereof for loading the SDR program. A frequency of the communication request channel has to be known to the UE in advance for tuning thereto and transmitting an SDR configuration request. The radio access network may transmit the SDR pointer as an answer to the SDR configuration request also using the communication request channel. Alternatively, the radio access network may transmit the SDR pointer via any other channel the SDR capable user equipment is capable to tune to. The UE accesses the SDR program in two steps. First, the location of the SDR program is received. The location may also be called an address, a resource or a time instance. Second, the SDR program is loaded from the received location.

In an alternative embodiment, the radio access network broadcasts a beacon comprising a pointer pointing to a location of the SDR program, the location comprising the dedicated SDR configuration channel or a subchannel of the dedicated SDR configuration channel. The SDR capable user equipment scans a predetermined frequency spectrum searching the broadcasted beac When the SDR capable UE is tuned to a frequency of the found broadcasted beacon, the SDR capable user equipment receives the broadcasted beacon and tunes to the dedicated SDR configuration channel or subchannel thereof pointed to by the pointer for loading the SDR program. In contrast to the previous embodiment the UE has to know the predetermined frequency spectrum in advance the beacon is broadcasted within. The UE is not required, however, to know a frequency the beacon is broadcasted at.

The beacon may be broadcasted at different frequencies. Using different frequencies for broadcasting the beacon provides an alternative in case a frequency or a range of frequencies within the predetermined frequency spectrum is disturbed due to an environmental condition. Thus, a reliability of loading the SDR program is improved.

Alternatively or additionally, a plurality of different beacons may be broadcasted at a single frequency. The different beacons are broadcasted successively. Each beacon may comprise a different pointer. The UE may select one of the different beacons and ignore the remaining beacons.

Still alternatively or additionally, a plurality of different beacons may be broadcasted at different frequencies. The different beacons are broadcasted either successively or simultaneously.

In a further embodiment the dedicated SDR configuration channel is provided by a wireless network, a radio unicast network, a radio broadcast network or a radio multicast network being different from the radio access network. For instance, a frequency of the SDR configuration channel may be within a terrestrial or non-terrestrial or space-based WLAN, radio or television frequency band. In other words, any alternative radio technology may be used for providing the dedicated SDR configuration channel which the SDR capable user equipment is configured for.

In other embodiments, the radio access network provides a plurality of SDR programs each enabling the SDR capable user equipment to support a different wireless communication protocol supported by the radio access network, and the SDR capable user equipment selects an SDR program out of the plurality of SDR programs, the selected SDR program enabling the SDR capable user equipment to support the desired wireless communication protocol. Thus, the radio access network allows the UE for establishing a plurality of different wireless communications. Accordingly, the SDR capable user equipment is not limited to load only the one SDR program enabling the SDR capable user equipment for supporting the desired wireless communication technology. Rather the SDR capable user equipment may load a combined SDR program or simultaneously a plurality of SDR programs enabling the SDR capable user equipment for supporting a plurality of wireless communication technologies.

In particular, the selected SDR program may be accessed via an SDR configuration channel identifier, an SDR configuration subchannel identifier, an SDR program identifier and/or a service identifier, the service transmitting the SDR program to the SDR capable user equipment. The identifier may be a unique number, a unique character or a unique combination of numbers and characters, i.e. a unique binary representation in form of a bit sequence. The identifier may even comprise a plurality of parts, i.e. be a multi-part identifier, each part identifying a different type of a location.

A second aspect of the invention is a radio access network, supporting a wireless communication technology defining at least one communication channel and providing an SDR program for being loaded by an SDR capable user equipment. The radio access network allows the SDR capable user equipment for using the communication channel after loading the SDR program from the radio access network, the SDR program enabling the SDR capable user equipment for supporting the wireless communication technology defining the communication channel to be used.

It is preferred that the radio access network is configured for carrying out a method according to the first aspect of the invention. Particularly, the radio access network may provide a dedicated SDR configuration channel which may be used by the SDR capable user equipment for loading the SDR program.

In a preferred embodiment, the radio access network is configured as a cellular network. There is a plurality of different radio access networks being provided by different companies. Accordingly, this embodiment may be applied many times.

It is preferred that the cellular network supports a wireless communication technology according to one of the radio technology standards GSM, UMTS, LTE, LTE-A, LTE-B, LTE-M, NB-IoT, 5G(NR), 6G, IEEE 802 or a later evolution of one of these radio technology standards. In other words, the invention may be readily applied both to a known radio technology standard and to an unknown future radio technology standard.

A third aspect of the invention is an SDR capable user equipment for a radio access network. An SDR program, on execution, may configure the SDR capable user equipment for supporting a desired wireless communication technology and establishing a wireless connection with the radio access network using the desired wireless communication technology.

According to the invention, the SDR capable user equipment is configured for carrying out a method according to the first aspect of the invention. The SDR capable user equipment is configured for loading the SDR program from the radio access network and may be configured for using a dedicated SDR configuration channel provided by the radio access network for loading the SDR program.

A fourth aspect of the invention is a computer program product comprising a computer readable storage medium storing a program code, the program code being executable by a computing device. The computing device may comprise a computer or a user equipment or a base station entity of the radio access network or a node of the radio access network or a node of a telecommunications network.

According to the invention, the program code causes the computing device to carry out a method according to the first aspect of the invention when being executed by a processor of the computing device. The program code may be completely executed on a single computing device. Alternatively or additionally, the program code may be partially executed on a plurality of different computing devices, respectively.

It is an advantage of a method according to the invention that the SDR capable user equipment may be easily configured for a plurality of different wireless communication technologies, i.e. the SDR capable user equipment may be configured in a very general way. As another advantage, the SDR capable user equipment may be readily configured during usage of the SDR capable user equipment at any time and on demand.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

Figure 1:
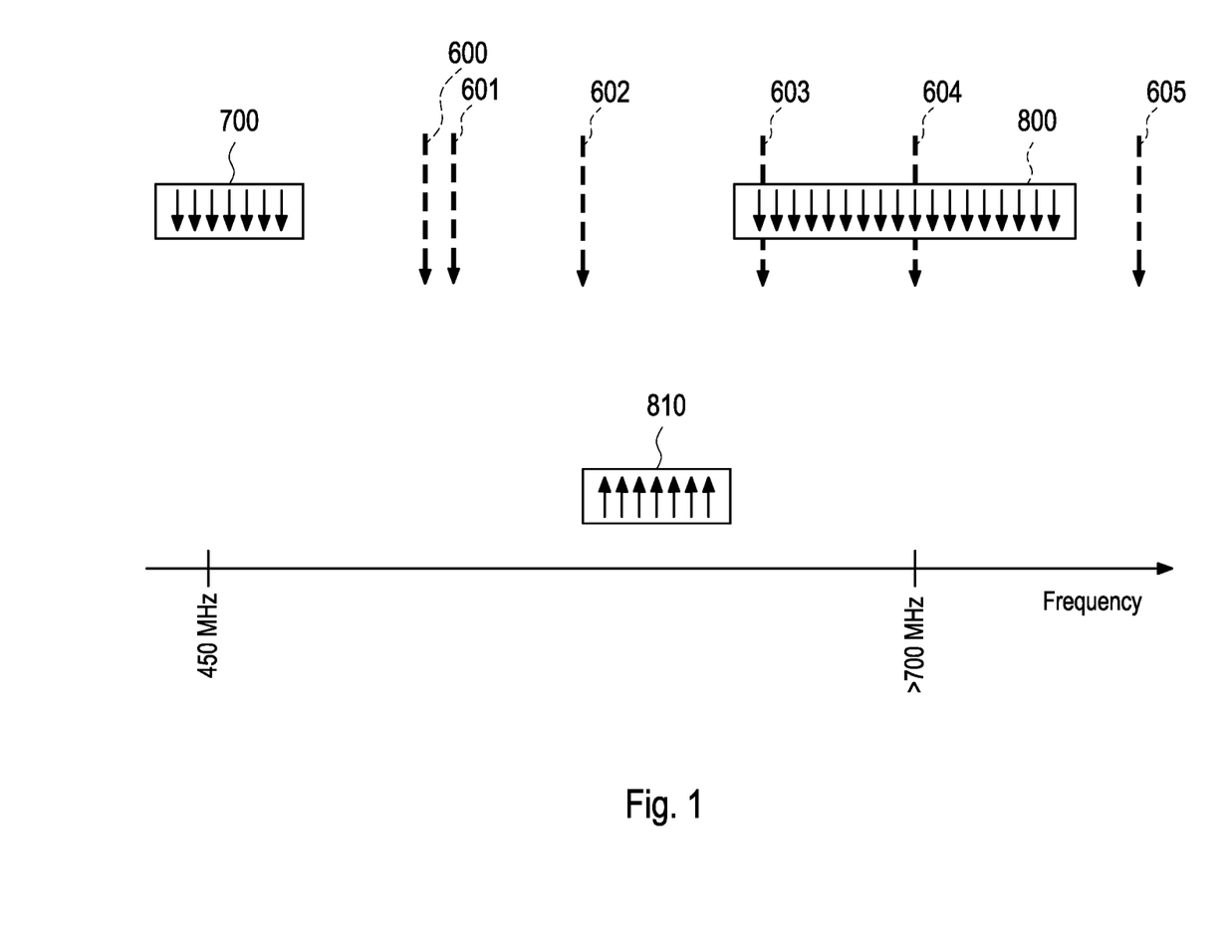
FIG. 1 schematically shows a channel arrangement of a radio access network according to a first embodiment of the invention.

FIG. 1 schematically shows a channel arrangement of a radio access network according to a first embodiment of the invention. The radio access network may be configured as a cellular network and preferably supports a plurality of wireless communication technologies, for instance, according to the radio technology standards GSM, UMTS, LTE, LTE-A, LTE-B, LTE-M, NB-IoT, 5G(NR), 6G, IEEE 802 or a later evolution of one of these radio technology standards. The IEEE 802 standard comprises WLAN (IEEE 802.11), WiMAX (IEEE 802.16) and the like. At least one of the wireless communication technologies may define a communication channel 800, 810 at an exemplary frequency above 700 MHz.

The communication channel 800, 810 is exemplarily configured as a FDD (frequency division duplex) channel in the usual way and comprises a downlink (DL) subchannel 810 and an uplink (UL) subchannel 800 at a lower frequency than a frequency of the downlink subchannel 810. However, the communication channel 800, 810 may alternatively be configured as a TDD (time division duplex) channel sharing a single frequency for downlink and uplink alternating in a time domain or as a FD (Full duplex) channel sharing both a single frequency and a common time domain for downlink and uplink.

The radio access network further provides an SDR program for being loaded by an SDR capable user equipment, i.e. a smartphone or the like for the radio access network which is not configured for a desired wireless communication technology. The radio access network preferably provides a plurality of SDR programs each configuring the SDR capable user equipment to support a different wireless communication technology supported by the radio access network.

In turn, the SDR capable user equipment is configured for loading and executing the SDR program provided by the radio access network.

The radio access network may provide a dedicated SDR configuration channel 700 at an exemplary frequency of about 450 MHz. Hence, the dedicated SDR configuration channel 700 may be disjoint with the communication channel 800, 810 defined by the wireless communication technology. Particularly, the dedicated SDR configuration channel 700 may be at a lower frequency than the communication channel 800, 810 used by the wireless communication technology. Furthermore, the dedicated SDR configuration channel 700 may be configured as a single downlink (DL) channel and is preferably provided as a multicast channel or as a broadcast channel. Alternatively, the dedicated SDR configuration channel may be at a higher frequency than the communication channel 800, 810 used by the wireless communication technology.

In other embodiments, the dedicated SDR configuration channel 700 is provided by a wireless network, a radio unicast network, a radio broadcast network or a radio multicast network being different from the radio access network.

The radio access network and the SDR capable user equipment are configured for carrying out the method described below. The method may be implemented by a program code being stored on a computer readable storage medium of a computer program product. The program code may be executable by a computing device and preferably causes the computing device to carry out the method when being executed by a processor of the computing device.

Figure 2:
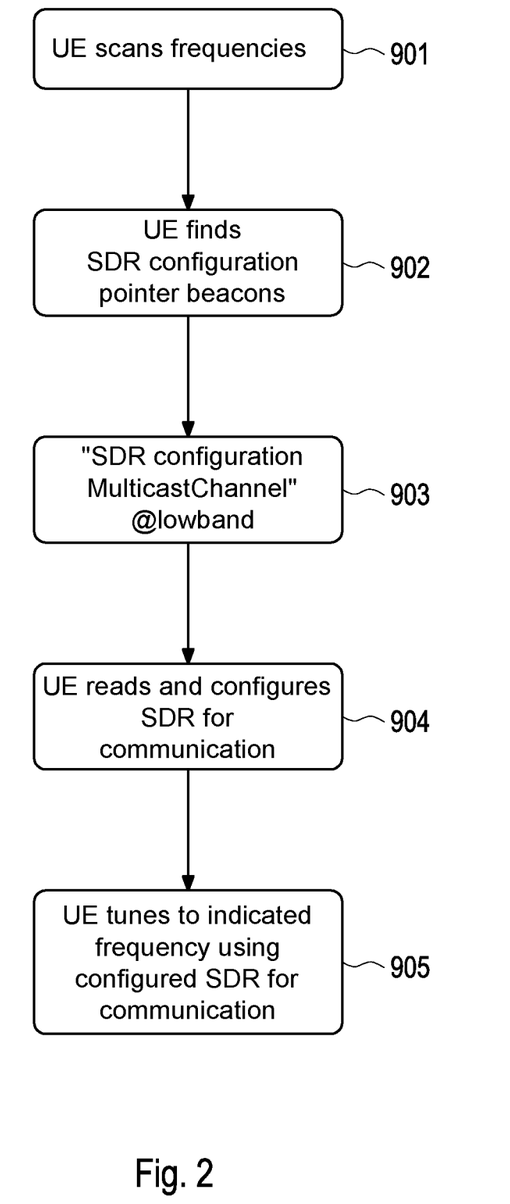
FIG. 2 schematically shows a flow diagram of a method according to a first embodiment of the invention for configuring an SDR capable user equipment and being carried out with the channel arrangement shown in FIG. 1.

FIG. 2 schematically shows a flow diagram of a method according to a first embodiment of the invention for configuring an SDR capable user equipment and being carried out with the channel arrangement shown in FIG. 1.

The radio access network broadcasts a plurality of different beacons 600, 601, 602, 603, 604, 605 at different frequencies within a predetermined frequency spectrum. Each beacon 600, 601, 602, 603, 604, 605 comprises a pointer pointing to a location of an SDR program. The location comprises the dedicated SDR configuration channel 700 or a subchannel of the dedicated SDR configuration channel 700.

In alternative embodiments a single beacon 600, 601, 602, 603, 604, 605 may be broadcasted at different frequencies or a plurality of different beacons 600, 601, 602, 603, 604, 605 is broadcasted at a single frequency successively.

The SDR capable user equipment scans 901 the predetermined frequency spectrum searching a broadcasted beacon 600, 601, 602, 603, 604, 605. The SDR capable user equipment tunes to a found broadcasted beacon 600, 601, 602, 603, 604, 605 and receives 902 the broadcasted beacon 600, 601, 602, 603, 604, 605.

The SDR capable user equipment selects an SDR program from the plurality of SDR programs which is for configuring the SDR capable user equipment to support the desired wireless communication technology.

Afterwards, the SDR capable user equipment tunes 903 to the dedicated SDR configuration channel 700 or subchannel thereof pointed to by the pointer for loading the SDR program corresponding to the desired wireless communication technology.

In another step, the SDR capable user equipment wirelessly loads 904 the SDR program from the radio access network preferably using the dedicated SDR configuration channel 700. The SDR capable user equipment may access the SDR program by an SDR configuration channel 700 identifier, an SDR configuration subchannel identifier, an SDR program identifier and/or a radio access network service identifier, the radio access network service delivering the SDR program to the SDR capable user equipment.

Then the SDR capable user equipment executes 904 the loaded SDR program which, on execution, configures the SDR capable user equipment to support the desired wireless communication technology.

The configured SDR capable user equipment at last connects to and communicates 905 with the RAN using the desired wireless communication technology.

Figure 3:
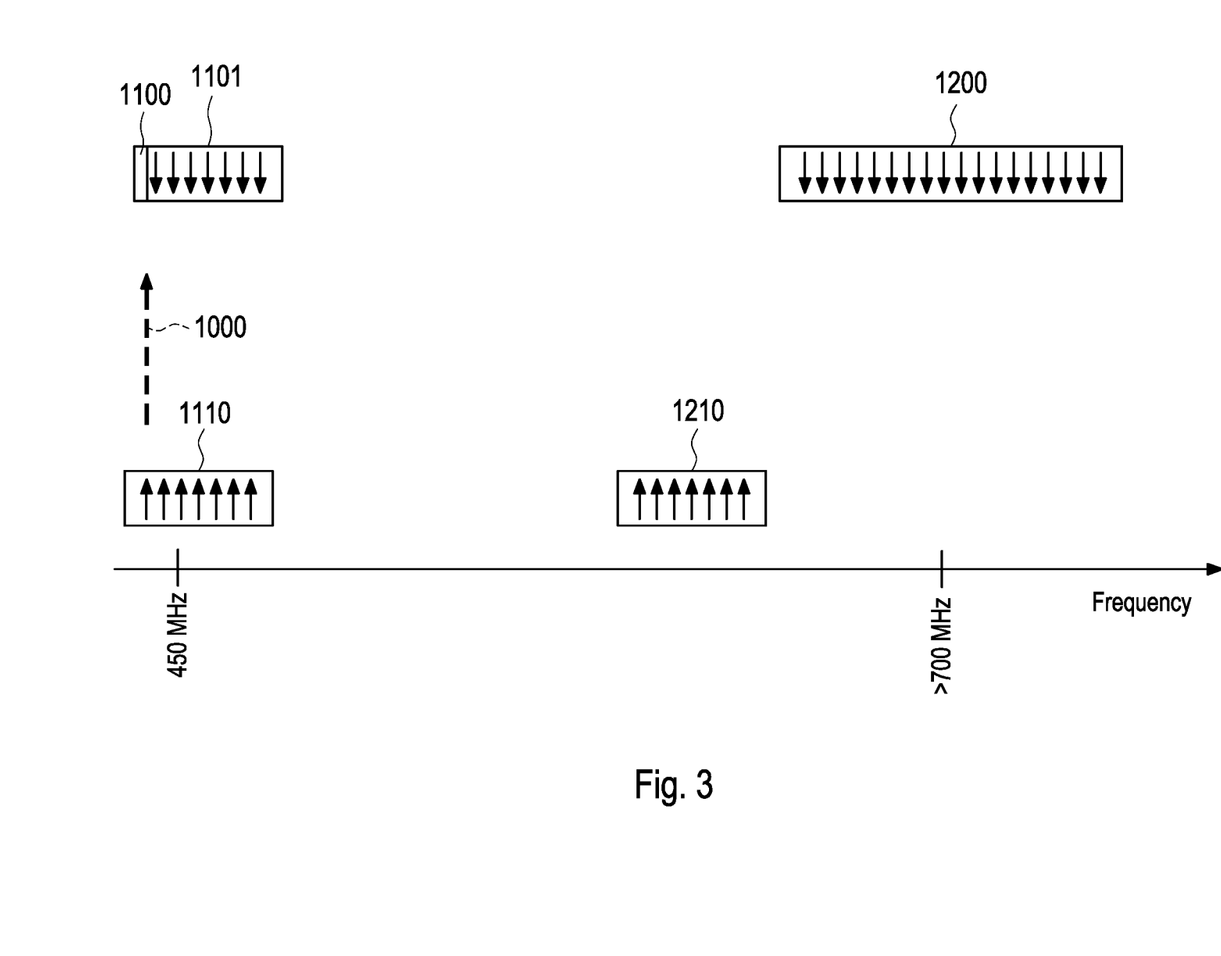
FIG. 3 schematically shows a channel arrangement of a radio access network according to a second embodiment of the invention.

FIG. 3 schematically shows a channel arrangement of a radio access network according to a second embodiment of the invention. The radio access network may be configured as a cellular network and preferably supports a plurality of wireless communication technologies, for instance, according to the radio technology standards GSM, UMTS, LTE, LTE-A, LTE-B, LTE-M, NB-IoT, 5G(NR), 6G, IEEE 802 or a later evolution of one of these radio technology standards. The IEEE 802 standard comprises WLAN (IEEE 802.11), WiMAX (IEEE 802.16) and the like. At least one of the wireless communication technologies may define a communication channel 1200, 1210 at an exemplary frequency above 700 MHz.

The communication channel 1200, 1210 is exemplarily configured as a FDD (frequency division duplex) channel in the usual way and exemplarily comprises a downlink (DL) subchannel 1200 and an uplink (UL) subchannel 1210 at a lower frequency than a frequency of the downlink subchannel 1200. However, the communication channel 1200, 1210 may alternatively be configured as a TDD (time division duplex) channel sharing a single frequency or as a FD (full duplex) channel sharing a single frequency and a common time domain.

The radio access network further provides an SDR program for being loaded by an SDR capable user equipment, i.e. a smartphone or the like, (not shown) for the radio access network which is not configured for a desired wireless communication technology. The radio access network preferably provides a plurality of SDR programs each configuring the SDR capable user equipment to support a different wireless communication technology supported by the radio access network.

In turn, the SDR capable user equipment is configured for loading and executing the SDR program provided by the radio access network.

The radio access network may provide a dedicated SDR configuration channel 1101, 1110 at an exemplary frequency of about 450 MHz. Hence, the dedicated SDR configuration channel 1101, 1110 may be disjoint with the communication channel 1200, 1210 defined by the wireless communication technology. Particularly, the dedicated SDR configuration channel 1101, 1110 may be at a lower frequency than the communication channel 1200, 1210 used by the wireless communication technology.

The dedicated SDR configuration channel is exemplarily configured as a FDD (frequency division duplex) channel in the usual way and comprises a downlink (DL) subchannel 1101 and an uplink (UL) subchannel 1110 at a lower frequency than a frequency of the downlink subchannel 1101. However, the communication channel 1101, 1110 may alternatively be configured as a TDD (time division duplex) channel sharing a single frequency or as a FD (full duplex) channel sharing a single frequency and a common time domain. Furthermore, the dedicated SDR configuration channel 1101, 1110 is preferably provided as a unicast channel, a multicast channel or as a broadcast channel.

The radio access network and the SDR capable user equipment are configured for carrying out the method described below. The method may be implemented by a program code being stored on a computer readable storage medium of a computer program product. The program code may be executable by a computing device and preferably causes the computing device to carry out the method when being executed by a processor of the computing device.

Figure 4:
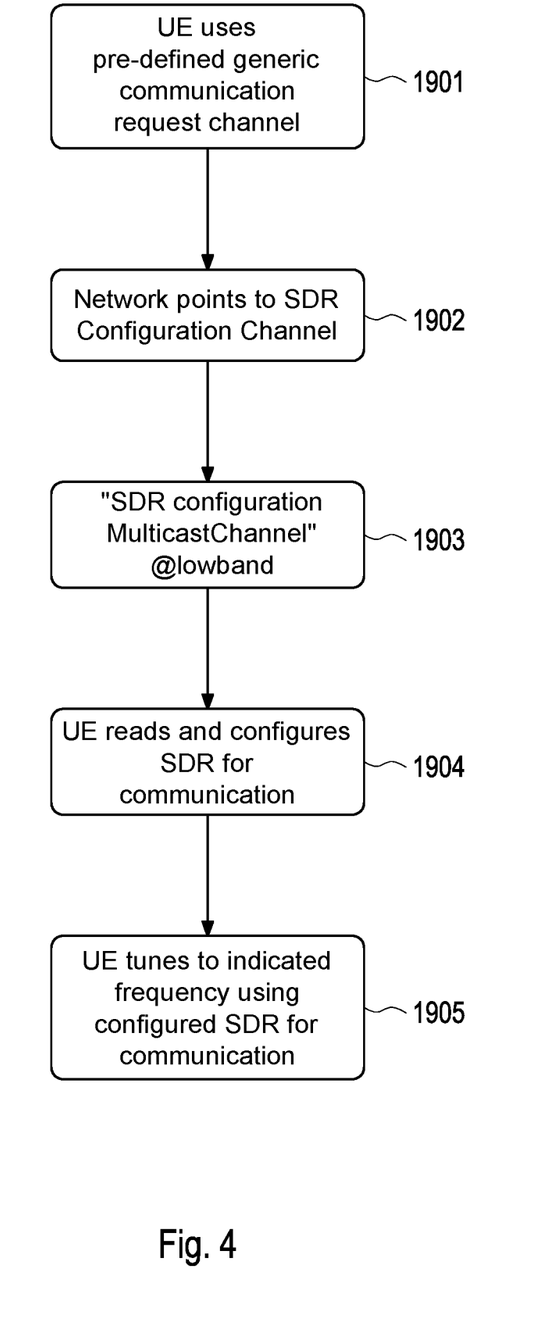
FIG. 4 schematically shows a flow diagram of a method according to a second embodiment of the invention for configuring an SDR capable user equipment and being carried out with the channel arrangement shown in FIG. 3.

FIG. 4 schematically shows a flow diagram of a method according to a second embodiment of the invention for configuring an SDR capable user equipment and being carried out with the channel arrangement shown in FIG. 3.

The SDR capable user equipment tunes 1901 to a predetermined communication request channel 1100 provided by the radio access network. Then the SDR capable user equipment, upon a request 1000, receives 1902 an SDR pointer using the communication request channel 1100, the pointer pointing to a location of the SDR program. The location comprises the dedicated SDR configuration channel 1101, 1110 or a subchannel of the dedicated SDR configuration channel 1101, 1110. Afterwards, the SDR capable user equipment tunes 1903 to the channel of the dedicated SDR configuration channel 1101, 1110 or to a subchannel thereof for loading the SDR program.

In another step, the SDR capable user equipment wirelessly loads 1904 the SDR program from the radio access network preferably using the dedicated SDR configuration channel 1101, 1110. The SDR capable user equipment may access the SDR program by an SDR configuration channel identifier, an SDR configuration subchannel identifier, an SDR program identifier and/or a radio access network service identifier, the radio access network service delivering the SDR program to the SDR capable user equipment.

Then the SDR capable user equipment executes 1904 the loaded SDR program which, on execution, configures the SDR capable user equipment to support a desired wireless communication technology.

The configured SDR capable user equipment at last connects to and communicates 1905 with the RAN using the desired wireless communication technology or technologies.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 600 beacon
601 beacon
602 beacon
603 beacon
604 beacon
605 beacon
700 SDR configuration channel
800 communication channel downlink
810 communication channel uplink
901 scanning a frequency spectrum
902 receive the beacon
903 tuning to the dedicated SDR configuration channel
904 loading and executing the SDR program
905 connecting to and communicating with the RAN
1000 communication request
1100 communication request channel
1101 SDR configuration channel downlink
1110 SDR configuration channel uplink
1200 communication channel downlink
1210 communication channel uplink
1901 tuning to the communication request channel
1902 receiving an SDR pointer
1903 tuning to the dedicated SDR configuration channel
1904 loading and executing the SDR program
1905 connecting to and communicating with the RAN

The invention claimed is:

1. A method for configuring a Software Defined Radio (SDR) capable user equipment, comprising the steps:
   wirelessly loading, by the SDR-capable user equipment, an SDR program from a radio access network using a dedicated SDR configuration channel, wherein the dedicated SDR configuration channel is disjoint with any communication channel defined by the desired wireless communication technology, wherein wirelessly loading the SDR program using the dedicated SDR configuration channel comprises:
      scanning, by the SDR-capable user equipment, a predetermined frequency spectrum searching for a beacon broadcasted by the radio access network;
      receiving, by the SDR-capable user equipment, the beacon broadcasted by the radio access network, wherein the beacon comprises a pointer pointing to a location of the SDR program, and wherein the location comprises the dedicated SDR configuration channel or a subchannel of the dedicated SDR configuration channel; and
      tuning, by the SDR-capable user equipment, to the dedicated SDR configuration channel or the subchannel of the dedicated SDR configuration channel pointed to by the pointer for loading the SDR program; and
   executing, by the SDR-capable user equipment, the loaded SDR program, wherein, on execution, the SDR program configures the SDR capable SDR-capable user equipment to support a desired wireless communication technology.

2. The method according to claim 1, wherein the dedicated SDR configuration channel is at a different frequency than any communication channel used by the desired wireless communication technology.

3. The method according to claim 1, wherein the dedicated SDR configuration channel is provided as a unicast channel, a multicast channel or as a broadcast channel.

4. The method according to claim 1, wherein the beacon is broadcasted at different frequencies and/or a plurality of different beacons is broadcasted at a single frequency and/or a plurality of different beacons is broadcasted at different frequencies.

5. The method according to claim 1, wherein the dedicated SDR configuration channel is provided by a wireless network, a radio unicast network, a radio broadcast network or a radio multicast network being different from the radio access network.

6. The method according to claim 1, wherein the radio access network provides a plurality of SDR programs each configuring the SDR-capable user equipment to support a different wireless communication technology supported by the radio access network, and the SDR-capable user equipment selects an SDR program from the plurality of SDR programs, the selected SDR program configuring the SDR-capable user equipment to support the desired wireless communication technology.

7. The method according to claim 6, wherein the selected SDR program is accessed by an SDR configuration channel identifier, an SDR configuration subchannel identifier, an SDR program identifier and/or a radio access network service identifier, the radio access network service delivering the SDR program to the SDR-capable user equipment.

8. An SDR-capable user equipment, comprising:
   a memory having processor-executable instructions stored thereon; and
   a processor, configured to execute the processor-executable instructions stored in the memory to facilitate the following being performed by the SDR-capable user equipment:
   wirelessly loading an SDR program from a radio access network using a dedicated SDR configuration channel, wherein the dedicated SDR configuration channel is disjoint with any communication channel defined by the desired wireless communication technology, and wherein wirelessly loading the SDR program using the dedicated SDR configuration channel comprises:
      scanning a predetermined frequency spectrum searching for a beacon broadcasted by the radio access network;
      receiving the beacon broadcasted by the radio access network, wherein the beacon comprises a pointer pointing to a location of the SDR program, and wherein the location comprises the dedicated SDR configuration channel or a subchannel of the dedicated SDR configuration channel; and
      tuning to the dedicated SDR configuration channel or the subchannel of the dedicated SDR configuration channel pointed to by the pointer for loading the SDR program; and
   executing the loaded SDR program, wherein, on execution, the SDR program configures the SDR-capable user equipment to support a desired wireless communication technology.

9. A non-transitory computer-readable medium having processor-executable instructions stored thereon for configuring a Software Defined Radio (SDR) capable-capable user equipment, wherein the processor-executable instructions, when executed, facilitate:
   wirelessly loading, by the SDR-capable user equipment, an SDR program from a radio access network using a dedicated SDR configuration channel, wherein the dedicated SDR configuration channel is disjoint with any communication channel defined by the desired wireless communication technology, and wherein wirelessly loading the SDR program using the dedicated SDR configuration channel comprises:
      scanning, by the SDR-capable user equipment, a predetermined frequency spectrum searching for a beacon broadcasted by the radio access network;
      receiving, by the SDR-capable user equipment, the beacon broadcasted by the radio access network, wherein the beacon comprises a pointer pointing to a location of the SDR program, and wherein the location comprises the dedicated SDR configuration channel or a subchannel of the dedicated SDR configuration channel; and
      tuning, by the SDR-capable user equipment, to the dedicated SDR configuration channel or the subchannel of the dedicated SDR configuration channel pointed to by the pointer for loading the SDR program; and
   executing, by the SDR-capable user equipment, the loaded SDR program, wherein, on execution, the SDR program configures the SDR-capable user equipment to support a desired wireless communication technology.

* * * * *